(12) United States Patent
Van Der Sluis

(10) Patent No.: US 6,196,806 B1
(45) Date of Patent: Mar. 6, 2001

(54) CONTINUOUSLY VARIABLE TRANSMISSION

(75) Inventor: Francis Maria Antonius Van Der Sluis, Sint-Michielsgestel (NL)

(73) Assignee: Van Doorne's Transmissie B.V., Tilburg (NL)

( * ) Notice: Subject to any disclaimer, the term of this patent is extended or adjusted under 35 U.S.C. 154(b) by 0 days.

(21) Appl. No.: 09/400,841

(22) Filed: Sep. 21, 1999

(30) Foreign Application Priority Data

Sep. 21, 1998 (NL) .................................................. 1010144

(51) Int. Cl.[7] ............................ F04B 23/04; F04B 49/00; F04B 39/10
(52) U.S. Cl. ............................ 417/62; 417/295; 417/571
(58) Field of Search ............................ 417/62, 248, 571, 417/295; 476/8, 14; 474/91, 93

(56) References Cited

U.S. PATENT DOCUMENTS

| 2,218,565 | * | 10/1940 | Vickers | 417/62 |
| 3,838,941 | * | 10/1974 | Roschupkin et al. | 417/62 |
| 4,625,749 | * | 12/1986 | Eskildsen | 137/115 |
| 5,431,545 | * | 7/1995 | Knight et al. | 417/248 |
| 5,941,786 | * | 8/1999 | Van Wijk et al. | 474/18 |

FOREIGN PATENT DOCUMENTS

| 196 53 636 | 6/1998 | (DE) . |
| 0 764 799 | 3/1997 | (EP) . |
| 0 826 910 | 3/1998 | (EP) . |

* cited by examiner

Primary Examiner—Charles G. Freay
Assistant Examiner—Michael K. Gray
(74) Attorney, Agent, or Firm—Young & Thompson

(57) ABSTRACT

Continuously variable transmission having a hydraulically adjustable transmission ratio, includes a hydraulic circuit that interacts with a reservoir, at least two pumps for pumping hydraulic medium from the reservoir to an outflow channel and adjustor which act on the circuit, for switching the pumps in series or in parallel or is suitable for making and breaking hydraulic connections between an outlet opening of the first pump and an inlet opening of the second pump, between the outlet of the first pump and the outflow channel and between the inlet opening of the second pump and the reservoir and is at least provided with individual hydraulic elements for making and breaking a hydraulic connection between the outlet opening of the first pump and the inlet of the second pump and between the reservoir and the inlet opening of the second pump.

14 Claims, 3 Drawing Sheets

CONTINUOUSLY VARIABLE TRANSMISSION

BACKGROUND OF THE INVENTION

The invention relates to a continuously variable transmission or CVT according to the preamble of claim 1.

DESCRIPTION OF THE RELATED ART

Such a CVT is disclosed in the patent publication EP-A-0 826 910 and is used in particular for motor vehicles. The transmission ratio of the CVT is hydraulically continuously adjustable in a certain range of transmission ratios. The usual requirement for the known CVT is that the volume flow and the pressure of the hydraulic medium needed to control the CVT must be adjustable within a wide range. A high volume flow is needed to effect a substantial change in the transmission ratio within a short time, whilst a low volume flow suffices for maintaining the transmission ratio and the lubrication of the CVT. The power taken up by the pumps is partly determined by the magnitude of the volume flow delivered by the pumps, as a result of which the preference is, in principle, to allow the pumps to deliver as low as possible a volume flow. In order to be able to comply with the said requirement efficiently, in the known construction the hydraulic circuit is provided with hydraulic adjustment means for switching the pumps in series or in parallel. When the pumps are switched in parallel the volume flows delivered by the individual pumps are combined to give one high volume flow, whilst when the pumps are switched in series, the volume flow delivered by a first pump is fed to a second pump. Thus, when the pumps are switched in series a low volume flow is delivered, which is equal to at most the lowest volume flow delivered by a pump. The power taken up by the pumps connected in series is thus significantly lower than the power taken up by the pumps switched in parallel. By operating the pumps switched in series when possible, the CVT is utilized efficiently.

In the known CVT the inlet openings of the first and the second pump are connected to a reservoir for hydraulic medium and the outlet openings of the first and the second pump are connected to an outflow channel. In this construction the hydraulic adjustment means consist of a switch valve, by means of which the outlet opening of the first pump can be connected to either the inlet opening of the second pump or the outflow channel. In the former case the pumps are switched in series, the switch valve also connecting the inlet opening of the second pump to the reservoir. The known switch valve is provided with four hydraulic ports. A first port is connected to the outflow channel, a second port is connected to the outlet opening of the first pump, a third port is connected to the inlet opening of the second pump and a fourth port is connected to the reservoir. The switching element of the switch valve is provided with two annular recesses such that when the pumps are switched in series the second and the third port are hydraulically connected to one another via an annular recess, whilst the first and fourth port are closed off by the switching element, and when the pumps are switched in parallel both the first and the second port and also the third and the fourth port are hydraulically connected to one another via an annular recess. The known switch valve is furthermore also provided with a fifth port connected to the reservoir for discharging surplus hydraulic medium.

The known CVT operates satisfactorily but has the disadvantage that brief but violent pressure variations in the hydraulic circuit occur during use of the pumps. Such pressure variations disturb the operation of the CVT and also produce an annoying noise. Moreover, a high force is required to change the position of the switching element since high volume flows under a high pressure have to be closed off and/or diverted during switching of the switch valve. Moreover, as a construction, the switch valve used in the known CVT has the disadvantage that it is elongated, because it is provided with five ports separated from one another. The known switch valve is further provided with a relief valve, for which a bore that is difficult to produce is required.

SUMMARY OF THE INVENTION

The aim of the present invention is to provide a CVT in which undesirable and interfering pressure variations have been largely overcome and in which the adjustment means can be produced advantageously. According to the invention a CVT of this type is obtained with the aid of the adjustment means according to the below disclosure.

A CVT according to the invention has the advantage that the hydraulic connections needed for switching the pumps in series and in parallel are made and broken by at least two separate valves. By means of the measure according to the invention it becomes possible for the valves to be opened more or less simultaneously during switching of the pumps. The opening and closing of the ports consequently proceeds sequentially and automatically, without abrupt changes in pressure. Furthermore, valves of simple construction can be used.

In a particular embodiment of the invention the switching means comprise a non-return valve and a switch valve. The switch valve is provided with three hydraulic ports, there always being two of these connected to one another in the two extreme positions of the switch valve. With this arrangement the switching element of the switch valve is so designed that all three ports can temporarily be in communication with one another during switching of the switch valve. Preferably, the switch valve is used for switching the outlet opening of the first pump between the inlet opening of the second pump and the outflow channel. The non-return valve is then mounted between the inlet opening of the second pump and the reservoir, such that hydraulic medium is able to flow from the reservoir to the inlet opening of the second pump. In the adjustment means according to the invention no pressure build-up takes place during switching of the switch valve because the said valves are opened more or less simultaneously. Consequently switching of the pumps proceeds smoothly and without abrupt changes in pressure.

According to a further development of the invention, the switch valve is electromagnetically controllable. As a result it is possible to allow switching of the pumps to take place with the aid of electronic means, for example as a function of transmission parameters such as the speed of revolution of the input shaft of the CVT or the rate at which the transmission ratio changes. It is then always possible to switch the pumps in parallel, so that a high volume flow can be delivered at the desired point in time. If the switch valve is hydraulically damped, for example with the aid of a restriction, the transition between the two extreme positions of the switch valve proceeds extremely uniformly, whilst the electromagnetic control can still consist of a simple on/off control.

According to yet a further development of the invention, a non-return valve is pretensioned by a spring. What is achieved by pretensioning a non-return valve is that said valve allows the passage of hydraulic medium only when there is a certain pressure drop in the direction of passage over the non-return valve. A non-return valve can advantageously be provided with hydraulic damping means which allow the opening and closing of the non-return valve to proceed uniformly.

A significant ancillary advantage of switching the pumps in series is that the occurrence of cavitation close to the inlet opening of a second pump can be largely if not completely prevented. Cavitation occurs if the pressure of the hydraulic medium falls below a critical value and is associated with undesirable effects, such as the production of noise and wear of pump components. In order to prevent cavitation in the inlet opening of the second pump, the volume flow delivered by the first pump is adjusted such that it is always greater than the volume flow demanded by the second pump. As a result, when the pumps are switched in series an overpressure is built up in the inlet opening of the second pump, as a consequence of which the pressure in the inlet opening is not able to fall below the said critical value.

In a preferred embodiment the adjustment means comprise three valves, for example a single switch valve and two non-return valves. In such a case the non-return valves are accommodated in the hydraulic circuit in such a way that when the switch valve is operated, for example after a specific volume flow in the outflow channel has been exceeded, the state of non-return valves changes as a consequence of changes in pressure in the hydraulic circuit. Adjustment means which are simple but nevertheless operate well are obtained in this way.

Especially for switching pumps which deliver relatively high volume flows and where the volume flow delivered by a first pump is greater than the volume flow demanded by a second pump, the change in the pressure of the hydraulic medium fed to the outflow channel can be optimised still further. According to one development of the invention which is particularly suitable for this purpose, the adjustment means comprise the said single switch valve, a non-return valve having a control pressure channel and a so-called cartridge valve. The switch valve is mounted between the outlet opening of a first pump and the inlet opening of a second pump, such that when the switch valve is in an open position a hydraulic communication exists between the said outlet opening and the inlet opening, whereas the said hydraulic communication does not exist when the switch valve is in a closed position. The non-return valve in the abovementioned particularly suitable development is pretensioned by a spring and provided with a control pressure channel and is mounted between the reservoir and the inlet opening of the second pump. In the said open position of the switch valve, the pumps are switched in series. In order to prevent the said overpressure at the inlet of the second pump from rising inadmissibly high in such a case, the non-return valve is mounted such that hydraulic medium is allowed to pass through if a sufficiently large pressure drop over the non-return valve prevails in the direction from the inlet opening of the second pump to the reservoir. With this arrangement the spring force is the determining factor for the level of the pressure which is built up by the first pump close to the inlet of the second pump.

In the closed position of the switch valve the pumps are switched in parallel. In such a case a pressure drop prevails over the non-return valve in a direction which is opposed to the direction of passage, so that the second pump would not be able to draw any medium from the reservoir. The non-return valve is, however, provided with a control pressure channel, so that the valve can also be opened with the aid of a control pressure and can allow hydraulic medium to pass in the direction opposed to the direction of passage. The control pressure required to open the non-return valve is obtained from close to the outlet of the first pump.

The cartridge valve is fitted between the outlet opening of the first pump and the outflow channel in such a way that hydraulic medium is allowed to pass through if a sufficiently large pressure drop prevails over the cartridge valve in the direction from the outlet opening of the first pump to the outflow channel. The cartridge valve has a relatively large diameter and is pretensioned by a spring having a relatively low spring constant. By this means, and because the control pressure is exerted directly by hydraulic medium which is virtually stationary at that location, a hydraulic channel having a large diameter can be opened and closed rapidly by means of such a valve, without any pressure variations worthy of note and with a low pressure loss. A cartridge valve can also advantageously be provided with damping means.

Using the adjustment means described above, it is possible, by operating the switch valve, to switch uniformly and reliably between series switching and parallel switching of the pumps, whilst, moreover, the production of cavitation close to the inlet opening of the second pump is prevented when the pumps are switched in series.

The adjustment means according to the invention can advantageously be used in combination with a multiple vane or roller pump. A multiple vane or roller pump has one rotor, but is provided with a number of pump compartments each having separate inlet openings and an outlet opening. The pump compartments behave like separate pumps which are driven by a common power source. The pump compartments can be switched in series or in parallel with the aid of the adjustment means according to the invention. To restrict the wear of the pump and the pump compartments to a minimum it is important to load the two pump compartments uniformly as far as possible, which can advantageously be achieved using the adjustment means according to the invention. In order to obtain the said overpressure when the pump compartments are switched in series it is necessary to use a multiple pump provided with pump compartments of unequal stroke volumes, the volume flow delivered by the first pump compartment being greater than or at least equal to that from the second pump compartment over the entire rev range of the power source.

The continuously variable transmission or CVT according to the invention is further illustrated below with reference to illustrative embodiments.

BRIEF DESCRIPTION OF THE DRAWINGS

FIG. 1A shows a CVT provided with a primary pulley and a secondary pulley.

DESCRIPTION OF THE PREFERRED EMBODIMENTS

Figure 1A:
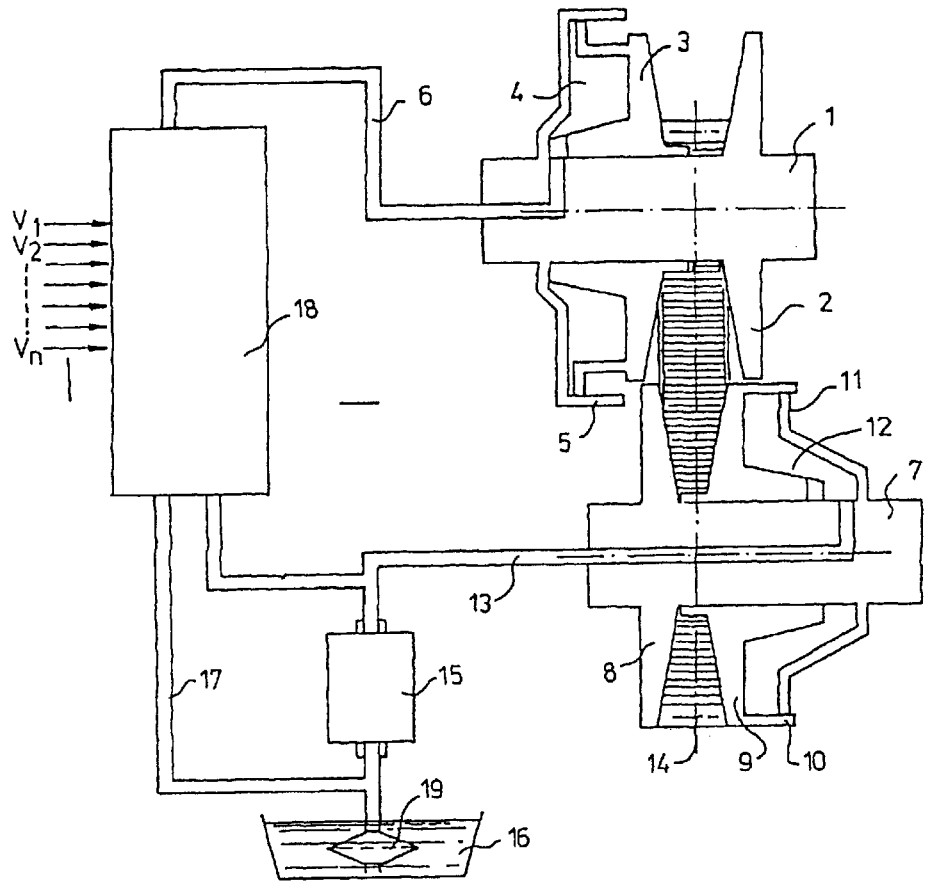
FIG. 1A is a diagrammatic view of a CVT having a hydraulic circuit according to the prior art.
Figure 1B:
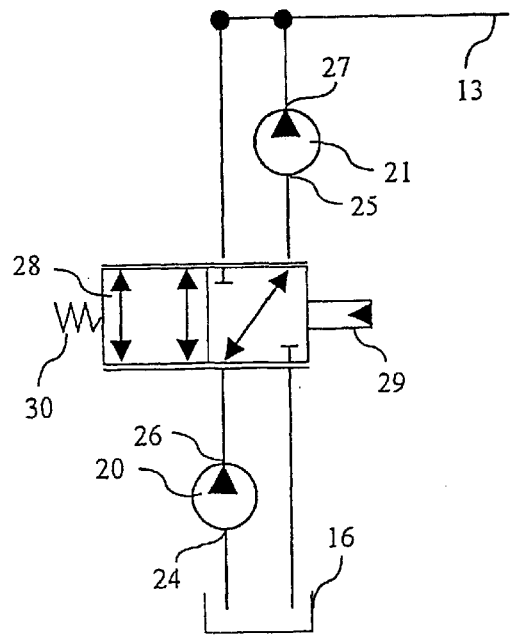
FIG. 1B is a diagrammatic view of the adjustment means according to the prior art.

The primary pulley comprises a pulley shaft 1, which can be connected to an input shaft, which is not shown here, of the CVT, a pulley disc 2, which is not displaceable with respect to the pulley shaft 1, or is fixed, and an axially displaceable pulley disc 3. In interaction with wall 5, the axially displaceable pulley disc 3 of the primary pulley forms a piston/cylinder assembly that has a pressure chamber 4. The secondary pulley comprises a pulley shaft 7, which can be connected to an output shaft, which is not shown here, of the CVT, a fixed pulley disc 8 and an axially displaceable pulley disc 9. In interaction with cylinder 10 and wall 11, the axially displaceable pulley disc 9 of the secondary pulley forms a piston/cylinder assembly that has a pressure chamber 12. A drive belt 14 is fitted between the pulley discs 2 and 3 of the primary pulley and between the pulley discs 8 and 9 of the secondary pulleys to transmit torque between the said pulleys. The known CVT further comprises a hydraulic circuit that interacts with a reservoir 16 for hydraulic medium, a filter 19, adjustment or switching means 15, an outflow channel 13, hydraulic channels 6 and 17 and control means 18 with variable inputs V1, V2, ... Vn for controlling the hydraulic pressure in the pressure chambers 4 and 12. The adjustment means 15 are shown in more detail in FIG. 1B and interact with two pumps 20 and 21, which are each provided with an inlet opening 24 and 25, respectively, and an outlet opening 26 and 27, respectively. The adjustment means 15 comprise a switch valve 28 for switching the pumps 20 and 21 in series or in parallel. In the position of the switch valve 28 shown in FIG. 1B the pumps 20 and 21 are switched in series. Via the outflow channel 13, the adjustment means are connected to the other parts of the hydraulic circuit. In a preferred embodiment, the two pumps 20 and 21 are formed by two pump compartments of one double or multiple vane or roller pump. Via its outlet opening 26, the pump 20 delivers hydraulic medium to the inlet opening 25 of pump 21, which, in turn, delivers hydraulic medium to the outflow channel 13. By reducing the pressure in the control pressure channel 29 of the switch valve 28 to a sufficient extent, the switch valve 28 switches the pumps 20 and 21, under the influence of a spring 30, into the position in which they are switched in parallel, so that the volume flow delivered jointly by the pumps 20 and 21 is fed to the outflow channel. During switching of the switch valve 28, the outlet opening 26 of the first pump 20 and the inlet opening 25 of the second pump 21 are temporarily blocked, as a consequence of which an overpressure and a reduced pressure are built up in the hydraulic system. Such pressure fluctuations are undesirable for use in motor vehicles since they produce annoying noise and make control of the CVT more difficult or even disrupt this.

Figure 2A:
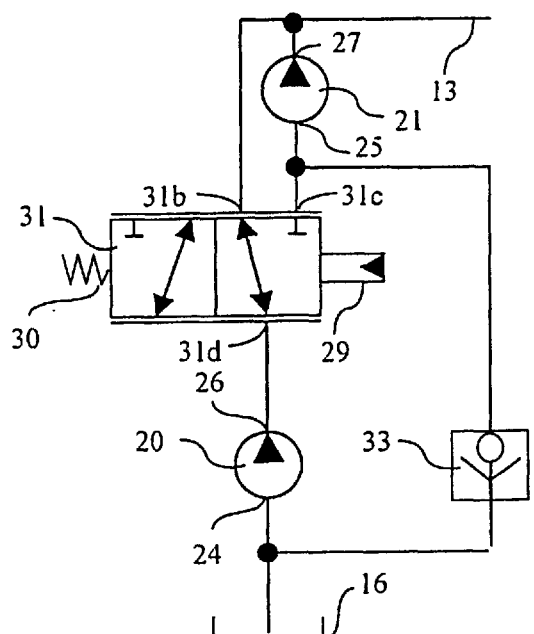
FIG. 2A is a diagrammatic view of the adjustment means according to the invention.
Figure 2B:
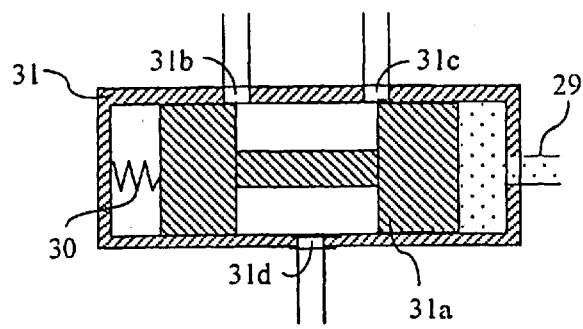
FIG. 2B is a cross-section of the switch valve of the adjustment means according to the invention.
Figure 3:
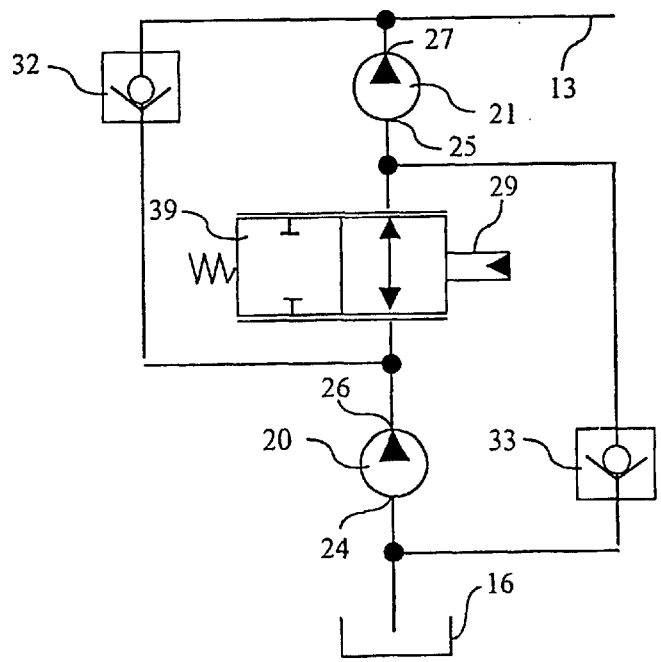
FIG. 3 is a further diagrammatic view of the adjustment means according to the invention.

FIG. 2A shows one development of the adjustment means 15 according to the invention. The adjustment means 15 comprise two valves 31 and 33. A switch valve 31, that is controllable as a function of the pressure in a control pressure channel 29, is used to make a hydraulic connection between the outlet 26 of the first pump 20 and either the inlet 25 of the second pump 21 or the outflow channel 13. In the position of the switch valve 31 shown in FIG. 2A, the two pumps 20 and 21 have been switched in parallel. The adjustment means further comprise a non-return valve 33 that is used to make and break a hydraulic connection between the inlet 25 of the second pump 21 and the reservoir 16. In the position of the switch valve 31 shown in FIG. 2A the non-return valve is opened by the volume flow which is demanded by the second pump 21. If the hydraulic connection between the outlet 26 of the first pump 20 and the outflow channel is now broken with the aid of the switch valve 31 and, at the same time, a hydraulic connection is made between the outlet 26 of the first pump 20 and the inlet 25 of the second pump 21, the non-return valve 33 will close and the pumps 20 and 21 will be switched in series. Non-return valve 33 is closed under the influence of the volume flow delivered by the first pump 20. FIG. 2B shows a cross-section of the switch valve 31. The switching element 31a is at one end subjected to a force originating from a spring 30. At the opposite end, the switching element 31a is subjected to a force under the influence of hydraulic pressure in a control pressure channel 29. The valve 31 can make a hydraulic connection between opening 31d and opening 31c or between opening 31d and opening 31b. In the intermediate position of the switching element 31a shown in FIG. 2B, the opening 31d is hydraulically connected to the other two openings 31b and 31c. Thus, neither the said reduced pressure nor the said overpressure can arise during switching of the pumps 20 and 21 between the position in which they are switched in series and the position in which they are switched in parallel. Moreover, the adjustment means provide a possibility for setting the switch valve 31 in such a way that a portion of the volume flow delivered by the first pump 20 is fed to the outflow channel 13 and a portion of said volume flow is fed to the inlet 25 of the second pump. As a result the volume flow delivered to the outflow channel 13 can be continually adjusted between, on the one hand, the volume flow delivered by the second pump 21 and, on the other hand, the sum of the volume flows delivered by the two pumps 20 and 21. Use of the structurally simple switch valve 31 according to FIG. 2B has the disadvantage that such a valve 31 is difficult to set, inter alia because the three ports 31b, 31c and 31d are short-circuited during switching. The result of the said short-circuiting is that the outlet opening 27 and the inlet opening 25 of the second pump 21 are connected directly to one another, as a consequence of which undesirable pressure variations in the hydraulic circuit can still occur. FIG. 3 shows a development of the adjustment means 15 according to the invention which largely overcome the disadvantage indicated above. The adjustment means 15 comprise three valves 39, 32 and 33. A single switch valve 39, that is controllable as a function of the electromagnetically controllable control pressure in a control pressure channel 29, is used to make and break a hydraulic connection between the outlet 26 of the first pump 20 and the inlet 25 of the second pump 21. In the position of the switch valve 39 shown in FIG. 3, the two pumps 20 and 21 have been switched in series. The adjustment means further comprise two non-return valves 32 and 33. The first non-return valve 32 is used to make and break a hydraulic connection between the outlet 26 of the first pump 20 and the outflow channel 13. The second non-return valve 33 is used to make and break a hydraulic connection between the inlet 25 of the second pump 21 and the reservoir 16. In the position of the switch valve 39 shown, the non-return valves 32 and 33 are, in the hydraulic sense, positioned parallel to the pumps 21 and 20, respectively. As a consequence of the pressure drop prevailing over the pump 20 and the pump 21 in this situation, the two non-return valves 32 and 33 are closed. If the hydraulic connection between the outlet 26 of the first pump 20 and the inlet 25 of the second pump 21 is now broken with the aid of the switch valve 39, the two non-return valves 32 and 33 will open and the pumps 20 and 21 will be switched in parallel. Non-return valve 32 is opened by the volume flow that is delivered by pump 20 and non-return valve 33 is opened by the volume flow that is demanded by pump 21. The adjustment means 15 according to the invention have the advantage that switching of the pumps 20 and 21 takes place in a continuous manner, so that neither the said reduced pressure nor the said overpressure is produced. Moreover, the adjustment means provide a possibility for setting the switch valve 39 in such a way that a portion of the volume flow delivered by the first pump 20 is fed to the outflow channel 13 and a portion of said volume flow is fed to the inlet 25 of the second pump. Consequently, the volume flow fed to the outflow channel 13 can be continuously adjusted between, on the one hand, the volume flow delivered by the second pump 21 and, on the other hand, the sum of the volume flows delivered by the two pumps 20 and 21.

Figure 4A:
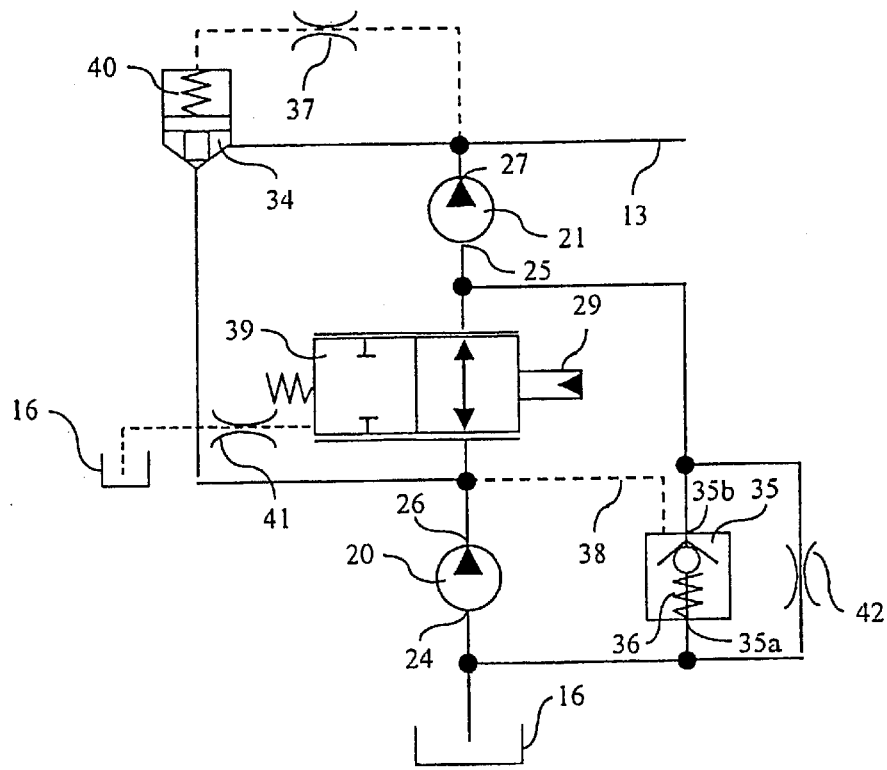
FIG. 4A is a diagrammatic view of a particular development of the adjustment means according to the invention.
Figure 4B:
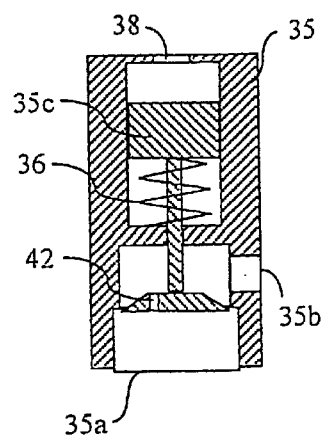
FIG. 4B is a diagrammatic view of a non-return valve.

FIG. 4A shows a further development of the adjustment means 15 according to the invention. The development of the adjustment means 15 shown in FIG. 4A is in particular suitable for reliable and smooth switching of two pump compartments 20 and 21 of a multiple roller pump that is able to deliver a large volume flow, it also being possible for the volume flow delivered by the first pump compartment 20 to be greater than the volume flow demanded by the second pump compartment 21. The adjustment means 15 are provided with the switch valve 39 that has been described above, a cartridge valve 34 and a non-return valve 35. The switch valve is hydraulically damped with the aid of a restriction 41. The cartridge valve 34 is pretensioned somewhat by means of a spring 40 and is used to make and break a hydraulic connection between the outlet 26 of the first pump 20 and the outflow channel 13. If the pressure close to the outlet 26 of the first pump 20 reaches a specific level, which is dependent on the force exerted by the spring 40 and on the hydraulic pressure prevailing in the outflow channel, the said hydraulic connection will be produced. The cartridge valve is provided with hydraulic damping means in the form of a restriction 37. The non-return valve 35 is used to make and break a hydraulic connection between the inlet 25 of the second pump 21 and the reservoir 16. The non-return valve 35 is pretensioned by means of a spring 36 and is provided with a control pressure channel 38 that is in communication with the outlet 26 of the first pump 20. The non-return valve is also provided with a hydraulic restriction 42, switched in parallel. On starting up the pump compartments 20 and 21 the problem arises that the pressure generated by the first pump compartment 20 in the control pressure channel 38 is insufficient to open the non-return valve 35. In such a case the second pump compartment 21 can still be provided with hydraulic medium via restriction 42. In the extreme position of the switch valve 39 shown in FIG. 4A, the other two valves 34 and 35 are, in principle, closed and the pumps are switched in series. If the volume flow delivered by the first pump 20 is greater than the volume flow demanded by the second pump 21, the pressure will rise close to the inlet 25 of the second pump 21 until the non-return valve 35 opens and hydraulic medium is discharged to the reservoir 16. The pressure at which the non-return valve 35 opens is dependent on the force exerted by the spring 36. It has been found that the adjustment means 15 function in an optimum manner at a value of the said pressure of between 1 and 3 bar. In the other extreme position of the switch valve 39, the other two valves 34 and 35 are opened and the pumps 20 and 21 are switched in parallel. Although, in the last-mentioned position of the switch valve 39, the pressure drop over the non-return valve 35 is in principle opposed to the direction of passage, said valve 35 is still opened by the presence of a control pressure in the control pressure channel 38. FIG. 4B is a diagrammatic view of a possible embodiment of the non-return valve 35. The switching element 35c makes or breaks a hydraulic connection between a port 35a, which is connected to the reservoir 16, and port 35b, which is connected to the inlet opening 25 of the second pump or the second pump compartment 21. With the aid of control pressure channel 38 the switching element 35c can be opened against the force exerted by the spring 36. The said restriction 42 switched in parallel is formed by a bore in the switching element 35c.

The invention is not restricted to the following claims, but also relates to a diversity of details such as those shown in the figures and given in the description.

What is claimed is:

1. Continuously variable transmission comprising:
   a hydraulically adjustable transmission ratio;
   a hydraulic circuit that interacts with a reservoir (16);
   at least two pumps (20, 21) operatively arranged for pumping hydraulic medium from the reservoir (16) to an outflow channel (13); and
   a switching means (15, 28, 31, 32, 33, 34, 35, 37, 39, 40, 41, 42) connected to act on the hydraulic circuit and arranged for switching said pumps (20, 21) in series or in parallel,
   the pumps (20, 21) being each provided with an inlet opening (24, 25) and an outlet opening (26, 27),
   the switching means being arranged for making and breaking hydraulic connections between the outlet opening (26) of the first pump (20) and the inlet opening (25) of the second pump (21), between the outlet opening (26) of the first pump (20) and the outflow channel (13) and between the inlet opening (25) of the second pump (21) and the reservoir (16),
   wherein the switching means is provided with a first hydraulic valve (31, 39) for making and breaking a hydraulic connection between the outlet opening (26) of the first pump (20) and the inlet opening (25) of the second pump (21),
   the first hydraulic valve (31, 39) is provided with a control pressure channel (29) for controlling the first hydraulic valve (31, 39) with the aid of an electromagnetically controllable control pressure and a second hydraulic valve (33) for making and breaking a hydraulic connection between the reservoir (16) and the inlet opening (25) of the second pump (21),
   the second hydraulic valve is a first non-return valve that makes or breaks a hydraulic connection under the influence of a pressure gradient over the valve and,
   the switching means further comprise a second non-return valve (32) for making and breaking a hydraulic connection between the outlet opening (26) of the first pump (20) and the outflow channel (13).

2. Continuously variable transmission according to claim 1, wherein the first and second non-return valves (34, 35) each comprise a pretensioning spring so that the first and second non-return valves are pretensioned by a spring (36).

3. Continuously variable transmission according to claim 2, characterised in that the spring (36) exerts a force on the first non-return valve (35) such that the first non-return valve (35) can be opened by a hydraulic pressure of approximately 1 to 3 bar.

4. Continuously variable transmission according to claim 2, wherein the second non-return valve (34) is of the so-called cartridge type, and wherein the second non-return valve (34) is constructed with a large diameter and the spring (36) having a low spring constant.

5. Continuously variable transmission according to claim 2, wherein the first non-return valve (35) can be opened by a control pressure.

6. Continuously variable transmission according to claim 5, wherein said control pressure is applied with the aid of another control pressure channel (38) that in the hydraulic sense is in direct communication with the outlet opening (26) of the first pump (20).

7. Continuously variable transmission comprising:

a hydraulically adjustable transmission ratio;

a hydraulic circuit that interacts with a reservoir (16);

at least two pumps (20, 21) operatively arranged for pumping hydraulic medium from the reservoir (16) to an outflow channel (13); and a switching means (15, 28, 31, 32, 33, 34, 35, 37, 39, 40, 41, 42) connected to act on the hydraulic circuit and arranged for switching said pumps (20, 21) in series or in parallel, the pumps (20, 21) being each provided with an inlet opening (24, 25) and an outlet opening (26, 27), the switching means being arranged for making and breaking hydraulic connections between the outlet opening (26) of the first pump (20) and the inlet opening (25) of the second pump (21), between the outlet opening (26) of the first pump (20) and the outflow channel (13) and between the inlet opening (25) of the second pump (21) and the reservoir (16), wherein the switching means is provided with a first hydraulic valve (31, 39) for making and breaking a hydraulic connection between the outlet opening (26) of the first pump (20) and the inlet opening (25) of the second pump (21), the first hydraulic valve (31, 39) is provided with a control pressure channel (29) for controlling the first hydraulic valve (31, 39) with the aid of an electromagnetically controllable control pressure and a second hydraulic valve (33) for making and breaking a hydraulic connection between the reservoir (16) and the inlet opening (25) of the second pump (21), and the second hydraulic valve being a first non-return valve that makes or breaks a hydraulic connection under the influence of a pressure gradient over the valve and, wherein the switching means (15, 28, 31, 32, 33, 34, 35, 37, 39, 40, 41, 42) is provided with a single switch valve (39) that is positioned between the outlet opening (26) of the first pump (20) and the inlet opening (25) of the second pump (21), the first non-return valve (35) is positioned between a reservoir (16) and the inlet opening (25) of the second pump (21) and can be opened with the aid of a control pressure line (38), and a second non-return valve (34) of the cartridge type that is positioned between the outlet opening (26) of the first pump (20) and the outflow channel (13).

8. Continuously variable transmission according to claim 7, wherein the switching means (15, 28, 31, 32, 33, 34, 35, 37, 39, 40, 41, 42) is provided with a hydraulic restriction (42) switched in parallel with the first non-return valve (35).

9. A continuously variable transmission comprising:

a hydraulically adjustable transmission ratio;

a hydraulic circuit that interacts with a reservoir (16);

at least two pumps (20, 21) operatively arranged for pumping hydraulic medium from the reservoir (16) to an outflow channel (13); and a switching means (15, 28, 31, 32, 33, 34, 35, 37, 39, 40, 41, 42) connected to act on the hydraulic circuit and arranged for switching said pumps (20, 21) in series or in parallel, the pumps (20, 21) being each provided with an inlet opening (24, 25) and an outlet opening (26, 27);

the switching means being arranged for making and breaking hydraulic connections between the outlet opening (26) of the first pump (20) and the inlet opening (25) of the second pump (21), between the outlet opening (26) of the first pump (20) and the outflow channel (13) and between the inlet opening (25) of the second pump (21) and the reservoir (16), wherein the switching means is provided with a first hydraulic valve (31, 39) for making and breaking a hydraulic connection between the outlet opening (26) of the first pump (20) and the inlet opening (25) of the second pump (21), the first hydraulic valve (31, 39) is provided with a control pressure channel (29) for controlling the first hydraulic valve (31, 39) with the aid of an electromagnetically controllable control pressure and a second hydraulic valve (33) for making and breaking a hydraulic connection between the reservoir (16) and the inlet opening (25) of the second pump (21), and the second hydraulic valve is a first non-return valve that is arranged to open and thereby make the hydraulic connection between the reservoir and the inlet opening of the second pump when the first and second pumps are switched in parallel and to close and thereby break the hydraulic connection when the first and second pumps are switched in series.

10. Continuously variable transmission according to claim 9, wherein the switching means are provided with a switch valve (31) having three hydraulic ports (31b, 31c and 31d) and having a switching element (31a), the switching element (31a) being able to assume a position such that the three said ports (31b, 31c and 31d) are hydraulically connected to one another.

11. Continuously variable transmission according to claim 9, wherein at least one of said first and second non-return valves is provided with damping means.

12. Continuously variable transmission according to claim 9, wherein the volume flow delivered by the first pump (20) is greater than or at least equal to the volume flow demanded by the second pump (21).

13. Continuously variable transmission according to claim 9, wherein at least part of the said pumps (20, 21) is formed by the pump compartments of a double or multiple vane or roller pump.

14. Continuously variable transmission of claim 11, wherein said damping means is a hydraulic restriction.

* * * * *